United States Patent

Scholfield

[11] Patent Number: 5,900,986
[45] Date of Patent: May 4, 1999

[54] COLUMNAR FOCAL LENS

[75] Inventor: David W. Scholfield, Albuquerque, N.M.

[73] Assignee: The United States of America as represented by the Secretary of the Air Force, Washington, D.C.

[21] Appl. No.: 09/098,773

[22] Filed: Jun. 17, 1998

[51] Int. Cl.$^6$ .............................. G02B 3/00; G02B 13/20; H01S 3/08
[52] U.S. Cl. .......................... 359/642; 359/664; 359/707; 372/101
[58] Field of Search ...................................... 359/642, 648, 359/662, 664, 707, 721, 724; 372/101

[56] References Cited

U.S. PATENT DOCUMENTS

| | | | |
|---|---|---|---|
| 3,974,507 | 8/1976 | Chemelli et al. | 372/101 |
| 4,426,707 | 1/1984 | Martin et al. | 372/101 |
| 4,830,454 | 5/1989 | Karstensen | 359/664 |
| 5,268,920 | 12/1993 | Esterowitz et al. | 372/101 |
| 5,315,614 | 5/1994 | Grace et al. | 372/101 |
| 5,692,005 | 11/1997 | Maag et al. | 372/101 |

OTHER PUBLICATIONS

J.R. Vaill, D. A. Tidman, T.D. Wilkerson, D. W. Koopman, "Propagation of High–voltage Streamers Along Laser–induced Ionization Trails," Appl. Phy. Ltrs., vol. 17, No. 1, pp. 20–22, Jul. 1, 1970.

T. J. Dwyer et al., "On the Feasibility of Using an Atmospheric Discharge Plasma as an RF Antenna," IEEE Trans. on Antennas and Propagation, vol. APPLICATION–32, No. 2, pp. 141–146, Feb. 1984.

*Primary Examiner*—Georgia Epps
*Assistant Examiner*—Evelyn A. Lester
*Attorney, Agent, or Firm*—Kenneth E. Callahan

[57] ABSTRACT

A lens is described that produces a columnar focus comprised of a continuum of focal points at varying distances from the principal plane of the lens aligned along the axis of the lens. The lens refracts an incident wavefront with a focal length that is dependent upon the radial distance from the axis of the lens. The radii of curvature of the primary surface of the lens is dependent upon the desired length of the focal column.

1 Claim, 4 Drawing Sheets

COLUMNAR FOCAL LENS

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

The present invention is directed to the field of optical lenses, and in particular to a lens that produces a columnar focus with the axis of the focal column perpendicular to the principal plane of the lens.

2. Description of the Prior Art

The concept of utilizing a plasma generated by laser guided electric discharges in the atmosphere as the conducting element of an antenna was introduced by Vallese (U. S. Pat. No. 3,404,403) in 1968. By 1970 Vaill had succeeded in producing a laser guided streamer (J. R. Vaill, D. A. Tidman, T. D. Wilkerson, D. W. Koopman, "Propagation of High-voltage Streamers Along Laser-induced Ionization Trails," Appl. Phy. Ltrs., Vol. 17, No. 1, pp. 20–22, Jul. 1, 1970). The principal objective was the development of an antenna with no physical structure, but with large effective area. While the basic theoretical and experimental work for laser antennas has been successfully accomplished, the goal of producing an ionized column of atmosphere for use as an antenna, or to direct lightning strikes, has proved to be elusive. The main difficulty in the production of a viable plasma antenna lies in the tendency of the plasma initially created to block the radiation required to maintain the plasma in a columnar geometry. Various strategies have been used to overcome this difficulty. For example, Dwyer used a laser to weakly ionize an atmospheric column and then discharged a marx generator through the weakly ionized column to achieve a sufficiently high free electron concentration (T. J. Dwyer et al, "On the Feasibility of Using an Atmospheric Discharge Plasma as an RF Antenna," IEEE Trans. on Antennas and Propagation, Vol. APPLICATION-32, No. 2, pp. 141–146, February 1984).

SUMMARY OF THE INVENTION

The present invention is a lens that produces a columnar focus with the axis of the focal column perpendicular to the principal plane of the lens. The lens refracts an incident wave front with a focal length that is dependent upon the radial distance from the axis of the lens. These foci produce a focal column. The radii of curvature of the primary surface of the lens are dependent upon the desired length of the focal column. The thus focused radiation can be used to generate free electron surfaces in the atmosphere for use as an antenna, to act as an electromagnetic transmission line, to induce lightning strikes, or for electronic counter measure purposes. The invention can also be used for end cavity pumping of a laser medium.

The lens design of the present invention permits incident radiation to travel around any existing plasma and thereby limit the blockage that occurs in the prior art.

DESCRIPTION OF THE PREFERRED EMBODIMENT

Figure 1:
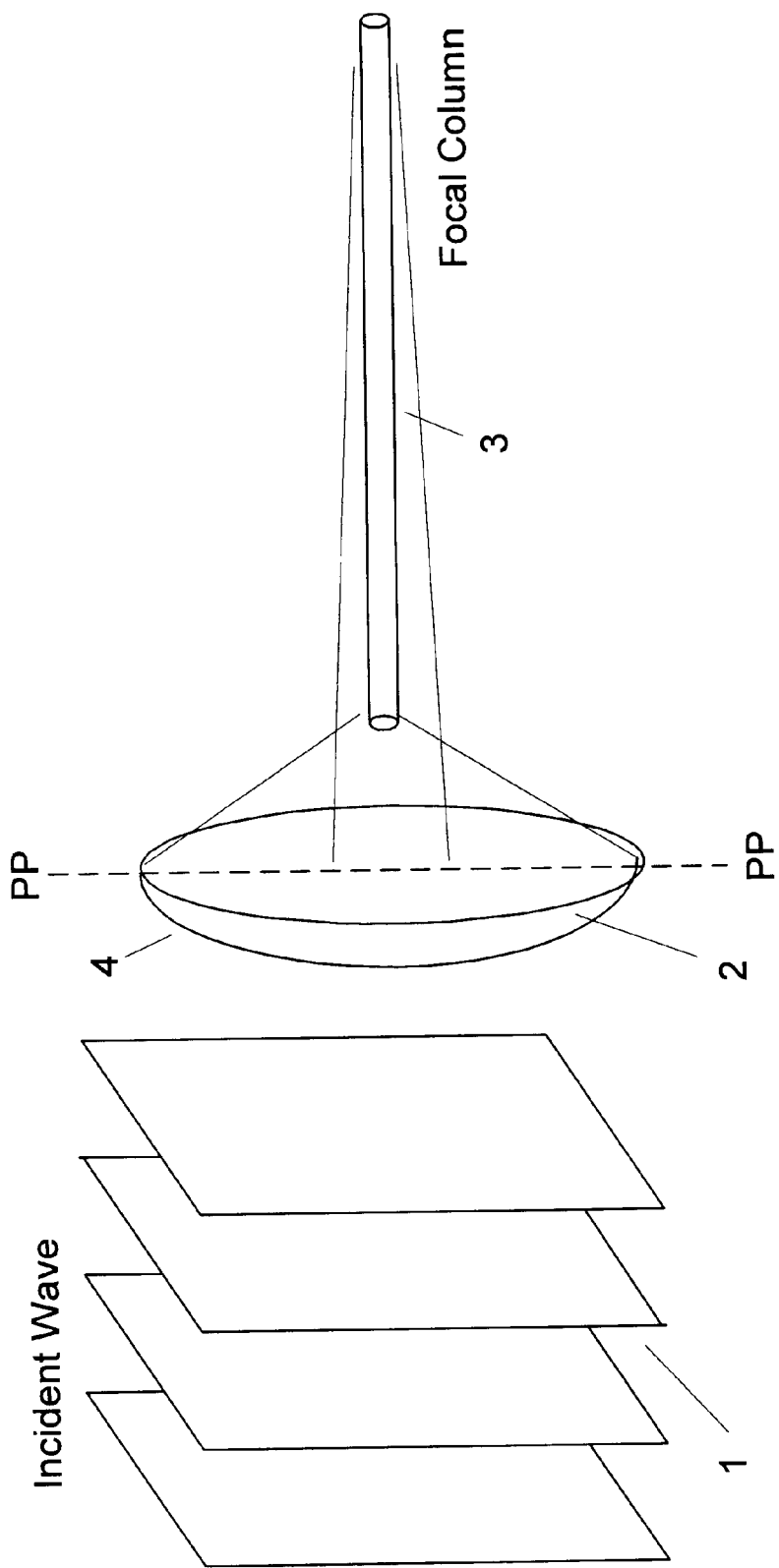
FIG. 1 shows the incident radiation, lens, and focal column formed by the lens.

The present invention is a lens that produces a columnar focus with the axis of the focal column perpendicular to the principal plane PP of the lens. Referring to FIG. 1, an incident wave front 1 approaches the lens 2 from the left traveling to the right. The lens refracts the wave front with a focal length that is dependent upon the radial distance from the axis of the lens. The amount of refraction at the edge of the lens is greater than that at the center of the lens. These foci produce a focal column 3. The radii of curvature of the primary surface of the lens 4 are dependent upon the desired length of the focal column L.

Figure 2:
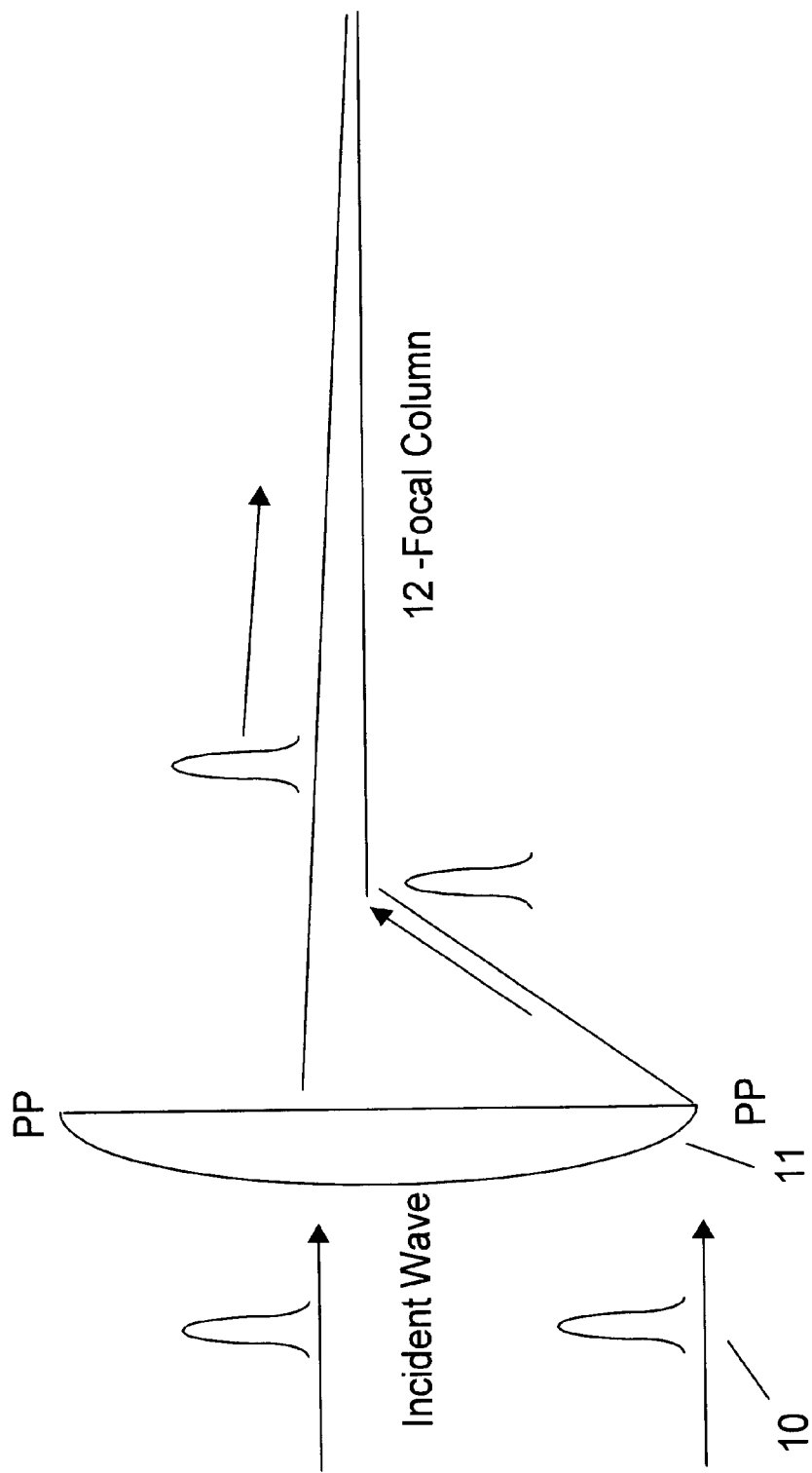
FIG. 2 shows the system where the incident radiation consists of electromagnetic pulses.

The incident wave could be an electromagnetic pulse or a continuous wave. A pulse embodiment is shown in FIG. 2. The time of flight of the pulse 10 at the edge of the lens 11 to the focal column 12 is greater than the time of flight of the pulse passing through the center of the lens. This difference in time can be made sufficiently large so that the component of the pulse passing through the lens center has adequate time to clear the focal point of the component from the lens edge.

To generate a plasma the electromagnetic pulse must be focused to a sufficient energy flux to achieve breakdown. This will first occur when the peak value of the electric field has reached a sufficient intensity. The process of tail erosion requires that that portion following the electromagnetic peak be attenuated. Since any plasma created by the breakdown occurs after the passage of the rising edge of the electromagnetic pulse, the rising edge portion of the pulse will continue along the length of the focal column. This rising edge will again be focused to sufficient energy flux to achieve breakdown.

Figure 3:
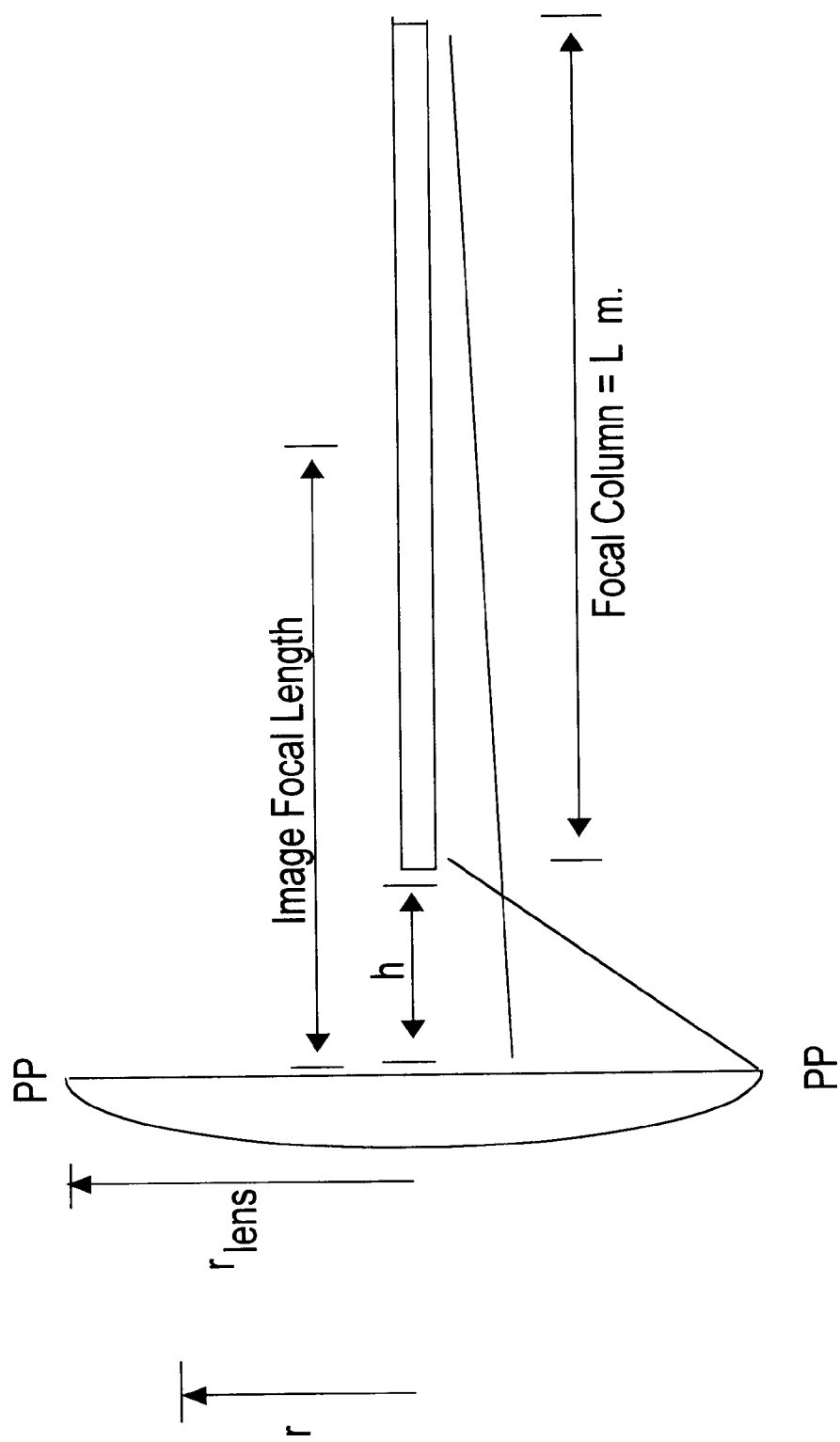
FIG. 3 is a side view of the lens and resultant focal column with variable parameters defined.

The parameters for the focal column lens system are defined in FIG. 3. Assume that the focal column 3 has an index of refraction of $n_o$ and is to be L meters long beginning h meters from the lens secondary surface. For free space, $n_o=1.0$; in the atmosphere, $n_o=1.00029$. The lens is to be made of a material with an index of refraction $n_{lens}$ and is constrained to be $r_{lens}$ meters in radius.

Utilizing results from Fermat's principle, $$\frac{n_0}{s_i} + \frac{n_{lens}}{s_0} = \frac{n_{lens} - n_0}{R}. \tag{1}$$

With the above substitutions for $n_o$, $n_{lens}$, and setting $s_o$ equal to ∞ with $s_i$ equal to $f_i$ yields $$\frac{n_0}{f_i} = \frac{n_{lens} - n_0}{R} \tag{2}$$

Thus the radius of curvature of the lens R is a function of the focal length, $$R = \frac{f_i(n_{lens} - n_0)}{n_0} \tag{3}$$

The focal length of the column is a function of the distance from the lens to the beginning of the column and the length of the focal column itself, $$f_i = h + L \times F(r) \tag{4}$$

where F(r) is a distribution function describing the dependency of the focal length on the radial distance from the axis of the lens. This distribution function is driven by the requirements of the desired energy distribution along the focal column. Via substitution of equation 4 into equation 3, one obtains $$R = \frac{(n_{lens} - n_0)}{n_0}[h + L \times F(r)] \tag{5}$$

Thus, the radius of curvature of the lens, R, is a function of the radial distance r from the axis of the lens. As can be seen from FIG. 3, the radius of curvature to the lens, R, must be at least as long as the radius of the lens, $r_{lens}$. Therefore, Equation 5 introduces the first physical restriction upon the values of $n_{lens}$, $r_{lens}$, h, and R.

$$R = \frac{(n_{lens} - n_0)}{n_0} h \geq r_{lens} \tag{6}$$

This requires that the focal column begin no closer than $$h \geq \frac{n_0 r_{lens}}{(n_{lens} - n_0)} \tag{7}$$

from the lens.

Figure 4:
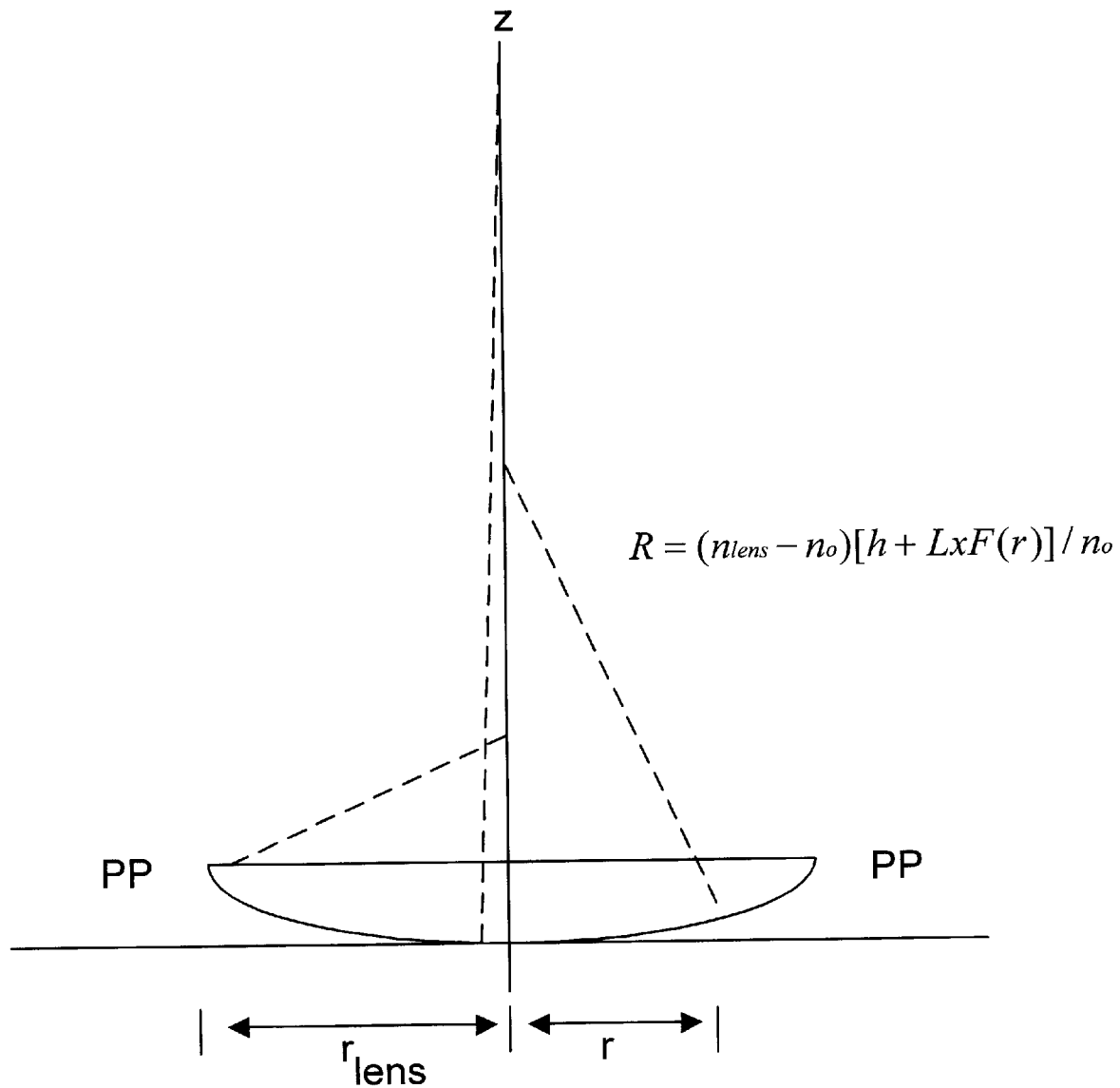
FIG. 4 shows the lens geometry such that the lens surface can be represented in cylindrical coordinates.

To establish an equation in cylindrical coordinates (r, θ, z) for the representation of the lens surface, the geometry of FIG. 4 is established. The lens has rotational symmetry so there is no θ dependency. The "z" coordinate is the distance along the axis of rotational symmetry and the "r" coordinate is the distance perpendicular to this axis.

Utilizing the Pythagorean theorem, the slope $m_R$ for the radius of curvature of the lens R is $$m_R = \frac{-\sqrt{R^2 - r^2}}{r} = \frac{-\left\{\frac{(n_{lens} - n_0)^2}{n_0^2}[h + L \times F(r)]^2 - r^2\right\}^{\frac{1}{2}}}{r} \tag{8}$$

Since the surface of the lens is perpendicular to the radius of curvature of the lens R, the slope of the surface of the lens $m_{lens}$ is the negative reciprocal of the slope of the radius of curvature.

$$m_{lens} = \frac{-1}{m_R} = \frac{r}{\left\{\frac{(n_{lens} - n_0)^2}{n_0^2}[h + L \times F(r)]^2 - r^2\right\}^{\frac{1}{2}}} \tag{9}$$

To obtain an equation for a line describing the surface of the lens, integrate $m_{lens}$ with respect to the r-coordinate, with the initial condition of z=0 at r=0.

Thus $$z = \int m_{lens} dr \tag{10}$$

$$z = \int \frac{rdr}{\{R^2 - r^2\}^{\frac{1}{2}}} = \int \frac{rdr}{\left\{\frac{(n_{lens} - n_0)^2}{n_0^2}[h + L \times F(r)]^2 - r^2\right\}^{\frac{1}{2}}} \tag{11}$$

EXAMPLE 1

Linear Radial Distribution

Consider a focal column in which the distribution function F(r) is a linear function in r such as $$F(r) = \frac{r_{lens} - r}{r_{lens}} \tag{12}$$

Equation 12 is not a requirement. The distribution function F(r) may adopt whatever form is required to produce the desired energy distribution along the focal column. Substitution of Equation 12 into Equation 11 produces $$z = \int \frac{rdr}{\left\{\frac{(n_{lens} - n_0)^2}{n_0^2}\left[h + L\left(\frac{r_{lens} - r}{r_{lens}}\right)\right]^2 - r^2\right\}^{\frac{1}{2}}} \tag{13}$$

Equation 13 may be rewritten as $$z = \int \frac{rdr}{\frac{(n_{lens} - n_0)}{n_0}\left[\left(\frac{L^2}{r_{lens}^2} - \frac{n_0^2}{(n_{lens} - n_0)^2}\right)r^2 - \frac{2L}{r_{lens}}(L+h)r + (L+h)^2\right]^{\frac{1}{2}}} \tag{14}$$

Evaluation of the integral in equation 14 yields

Equation 15

$$z(r) = \left\{\frac{\sqrt{\frac{(n_{lens}-n_0)^2}{n_0^2}\left(h + L\frac{r_{lens}-r}{r_{lens}}\right)^2 - r^2} - \frac{n_{lens}-n_0}{n_0}(h+L)}{\frac{(n_{lens}-n_0)^2}{n_0^2 r_{lens}^2}L^2 - 1} + \frac{\frac{(n_{lens}-n_0)^2}{n_0^2}\frac{L}{r_{lens}}(L+h)}{\left(\frac{(n_{lens}-n_0)^2}{n_0^2 r_{lens}^2}L^2 - 1\right)^{\frac{3}{2}}}\right.$$

$$\left. \ln\left[\frac{\sqrt{\frac{(n_{lens}-n_0)^2}{n_0^2 r_{lens}^2}L^2 - 1}\sqrt{\frac{(n_{lens}-n_0)^2}{n_0^2}\left(h + L\frac{r_{lens}-r}{r_{lens}}\right)^2 - r^2} + \left(\frac{(n_{lens}-n_0)^2}{n_0^2 r_{lens}^2}L^2 - 1\right)r - \frac{(n_{lens}-n_0)^2}{n_0^2}\frac{L}{r_{lens}}(h+L)}{\frac{(n_{lens}-n_0)}{n_0}(h+L)\sqrt{\frac{(n_{lens}-n_0)^2}{n_0^2 r_{lens}^2}L^2 - 1} - \frac{(n_{lens}-n_0)^2}{n_0^2}\frac{L}{r_{lens}}(h+L)}\right]\right\}$$

EXAMPLE 2

Constant Energy Deposition

Consider a focal column in which the distribution function F(r) deposits the energy in the incident wave uniformly along the length of the focal column.

$$F(r) = \frac{r^2_{lens} - r^2}{r^2_{lens}} \qquad (16)$$

Once more, this assumption is not a requirement. Then equation 11 becomes $$z = \int \frac{rdr}{\left\{ \frac{(n_{lens} - n_0)^2}{n_0^2} \left[ h + L\left( \frac{r^2_{lens} - r^2}{r^2_{lens}} \right) \right]^2 - r^2 \right\}^{\frac{1}{2}}} \qquad (17)$$

Evaluation of the integral yields $$z(r) = \frac{r^2_{lens}}{\left( \frac{n_{lens} - n_0}{n_0} \right) L} \ln \left\{ \frac{\left\{ \left( \frac{n_{lens} - n_0}{n_0} \right)^2 \left[ h + \frac{L}{r^2_{lens}} (r^2_{lens} - r^2) \right]^2 - r^2 \right\}^{\frac{1}{2}} + \left( \frac{n_{lens} - n_0}{n_0} \right) L \left( \frac{r}{r_{lens}} \right)^2 - \left[ \left( \frac{n_{lens} - n_0}{n_0} \right)(h + L) + \frac{r^2_{lens}}{2\left( \frac{n_{lens} - n_0}{n_0} \right) L} \right]}{- \frac{r^2_{lens}}{2\left( \frac{n_{lens} - n_0}{n_0} \right) L}} \right\} \qquad \text{Equation 18}$$

I claim:

1. A lens for producing a columnar focus with the axis of the focal column perpendicular to the principal axis, comprising:

a. a lens having a primary curved side and a secondary flat side, the primary side facing an incident electromagnetic wave and having rotational symmetry about the "z" axis in a cylindrical coordinate system; and b. the primary side of the lens being described in cylindrical coordinates (r, z) as $$z = \int \frac{rdr}{\{R^2 - r^2\}^{\frac{1}{2}}} = \int \frac{rdr}{\left\{ \frac{(n_{lens} - n_0)^2}{n_o^2} [h + L \times F(r)]^2 - r^2 \right\}^{\frac{1}{2}}}$$

where:

z—integral of the slope of the primary surface of the lens with respect to the r-coordinate, the initial conditions being z=0 and r=0;

r—distance measured perpendicular to the axis of rotational symmetry to a given point on the lens;

R—the radius of curvature of the lens at the distance r out from the axis of the lens $n_{lens}$—index of refraction of the lens;

n—index of refraction of the medium within which the electromagnetic wave travels;

h—distance from the flat surface of the lens to the beginning of the focal column measured along the lens axis;

L—length of the focal column;

F(r)—distribution function describing the dependency of the focal length on the radial distance from the axis of the lens.

* * * * *